United States Patent
Kim

(10) Patent No.: US 12,296,860 B2
(45) Date of Patent: May 13, 2025

(54) TRAVEL METHOD OF AUTONOMOUS VEHICLE

(71) Applicant: LG ELECTRONICS INC., Seoul (KR)

(72) Inventor: Sang Gook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 621 days.

(21) Appl. No.: 17/597,009

(22) PCT Filed: Jun. 24, 2019

(86) PCT No.: PCT/KR2019/007612
§ 371 (c)(1),
(2) Date: Aug. 29, 2022

(87) PCT Pub. No.: WO2020/262716
PCT Pub. Date: Dec. 30, 2020

(65) Prior Publication Data
US 2023/0174112 A1 Jun. 8, 2023

(51) Int. Cl.
*B60W 60/00* (2020.01)
*B60K 35/00* (2006.01)
(Continued)

(52) U.S. Cl.
CPC ...... *B60W 60/0053* (2020.02); *B60W 60/001* (2020.02); *B60K 35/00* (2013.01);
(Continued)

(58) Field of Classification Search
CPC .......... B60W 60/0053; B60W 60/001; B60W 2420/403; B60W 2552/10;
(Continued)

(56) References Cited

U.S. PATENT DOCUMENTS

2017/0010614 A1 1/2017 Shashua et al.
2017/0371337 A1* 12/2017 Ramasamy ............ G08G 1/056
(Continued)

FOREIGN PATENT DOCUMENTS

JP 2015005132 1/2015
KR 1020170017203 2/2017
(Continued)

OTHER PUBLICATIONS

Machine Translation of KR20180083745 (Year: 2018).*
PCT International Application No. PCT/KR2019/007612, International Search Report dated Mar. 24, 2020, 5 pages.

*Primary Examiner* — Anne Marie Antonucci
*Assistant Examiner* — Jordan T Smith
(74) *Attorney, Agent, or Firm* — LEE, HONG, DEGERMAN, KANG & WAIMEY

(57) ABSTRACT

The present invention relates to a method in which an autonomous vehicle generates a virtual lane on the basis of location parameters of road facilities, and travels along the generated virtual lane. A travel method of an autonomous vehicle according to an embodiment of the present invention is a travel method by which the autonomous vehicle autonomously travels along a virtual lane, the travel method including: a step for transmitting a request signal through a wireless network; a step for receiving location parameters of nearby road facilities from the road facilities in response to the request signal; a step for generating a virtual lane on the basis of the received location parameters; and a step for autonomously traveling along the generated virtual lane.

15 Claims, 14 Drawing Sheets

(51) Int. Cl.
*B60K 35/23* (2024.01)
*B60K 35/28* (2024.01)
*H04W 4/40* (2018.01)

(52) U.S. Cl.
CPC .............. *B60K 35/23* (2024.01); *B60K 35/28* (2024.01); *B60K 2360/166* (2024.01); *B60W 2420/403* (2013.01); *B60W 2552/10* (2020.02); *B60W 2552/30* (2020.02); *B60W 2555/20* (2020.02); *B60W 2556/45* (2020.02); *H04W 4/40* (2018.02)

(58) Field of Classification Search
CPC ......... B60W 2552/30; B60W 2555/20; B60W 2556/45; B60W 2556/50; B60W 2556/55; B60K 35/00; B60K 35/23; B60K 35/28; B60K 2360/166; B60K 35/85; B60K 2360/167; B60K 2360/175; B60K 2360/177; B60K 2360/589; B60K 2360/592; B60K 35/50; B60K 37/00; H04W 4/40; H04W 4/80; G06V 20/588; G05D 1/00; G05D 1/02
See application file for complete search history.

(56) References Cited

U.S. PATENT DOCUMENTS

| | | | |
|---|---|---|---|
| 2019/0324453 A1* | 10/2019 | Mori | B60W 50/14 |
| 2020/0086790 A1* | 3/2020 | Gallagher | G05D 1/02 |
| 2020/0273197 A1* | 8/2020 | Zhao | G01S 5/0295 |
| 2022/0126864 A1* | 4/2022 | Moustafa | B60W 60/0011 |
| 2023/0222908 A1* | 7/2023 | Yeung | G06V 20/582 |
| | | | 701/23 |

FOREIGN PATENT DOCUMENTS

| | | |
|---|---|---|
| KR | 1020180083745 | 7/2018 |
| KR | 101891725 | 8/2018 |

* cited by examiner

TRAVEL METHOD OF AUTONOMOUS VEHICLE

TECHNICAL FIELD

Disclosed herein is a method in which an autonomous vehicle generates a virtual lane, based on a position of a road facility and travels along the generated virtual lane.

BACKGROUND ART

In recent years, research has been performed into autonomous vehicles that travel autonomously to a destination, and autonomous driving technologies that are applied to the autonomous vehicles without a driver's manipulation.

The autonomous driving technologies of the related art involve a method in which an autonomous vehicle identifies a lane by using an external camera, a sensor and the like, generates a virtual lane corresponding to the identified lane, and travels along the generated virtual lane.

The method of the related art is based on the identification of a lane. Accordingly, when it is difficult to identify a lane in bad weather conditions such as heavy rain, heavy snow and the like, autonomous driving itself is impossible.

Against this backdrop, there is a growing need for a method by which an autonomous vehicle can generate a virtual lane and autonomously travel even when the autonomous vehicle cannot identify a lane.

DESCRIPTION OF INVENTION

Technical Problems

The objective of the present disclosure is to provide a method in which an autonomous vehicle generates a virtual lane, based on a position of a road facility, and travels along the generated virtual lane.

Aspects according to the present disclosure are not limited to the above ones, and other aspects and advantages that are not mentioned above can be clearly understood from the following description and can be more clearly understood from the embodiments set forth herein. Additionally, the aspects and advantages in the present disclosure can be realized via means and combinations thereof that are described in the appended claims.

Technical Solutions

To achieve the above objective, a travel method of an autonomous vehicle in one embodiment, by which the autonomous vehicle autonomously travels along a virtual lane, may include transmitting a request signal through a wireless network, receiving a location parameter of an adjacent road facility from the road facility in response to the request signal, generating a virtual lane, based on the received location parameter, and autonomously traveling along the generated virtual lane.

Advantageous Effects

According to the present disclosure, an autonomous vehicle generates a virtual lane, based on a position of a road facility, and travels along the generated virtual lane, and the autonomous vehicle generates a virtual lane even when the autonomous vehicle cannot identify a lane due to an external factor, and generates a virtual lane, based on a position of a fixed road facility and a relative distance between the road facility and the actual lane, thereby improving accuracy in generation of a virtual lane.

Specific effects are described along with the above-described effects in the section of detailed description.

DETAILED DESCRIPTION OF EXEMPLARY EMBODIMENT

Figure 1:
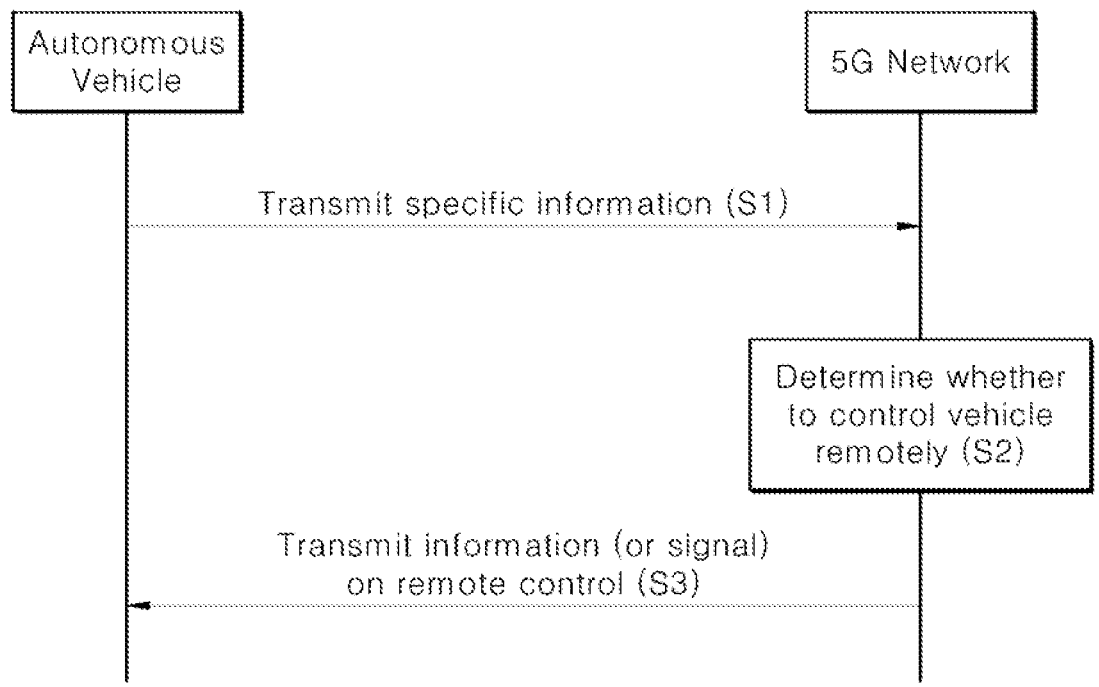
FIG. 1 is a view showing an example of basic operation of an autonomous vehicle and a 5G network in a 5G communication system.

The above-described aspects, features and advantages are specifically described hereafter with reference to the accompanying drawings such that one having ordinary skill in the art to which the present disclosure pertains can easily implement the technical spirit of the disclosure. In the disclosure, detailed description of known technologies in relation to the disclosure is omitted if it is deemed to make the gist of the disclosure unnecessarily vague. Below, preferred embodiments according to the disclosure are specifically described. In the drawings, identical reference numerals can denote identical or similar components.

The present disclosure relates to an autonomous vehicle's generation of a virtual lane, based on locations of road facilities, and a travel method of the autonomous vehicle's traveling along the virtual lane generated.

For an autonomous vehicle to travel, data communications is performed among the autonomous vehicle, road facilities and a server, as described hereunder. Before the subject matter of the disclosure is described, a method by which the autonomous vehicle performs data communications on a 5th Generation (5G) network is described with reference to FIGS. 1 to 6.

FIG. 1 is a view showing an example of basic operation of an autonomous vehicle and a 5G network in a 5G communication system.

The autonomous vehicle may transmit specific information to the 5G network (S1).

The specific information may include information on autonomous driving.

The information on autonomous driving may be information directly related to control over a vehicle's travel. For example, the information on autonomous driving may include one or more of object data indicating objects around a vehicle, map data, vehicle state data, vehicle location data and driving plan data.

The 5G network may determine whether to control the vehicle remotely (S2).

The 5G network may connect to a server or a module that performs remote control in relation to autonomous driving. Accordingly, the 5G network may transmit information on remote control (or signals) to the autonomous vehicle (S3).

Hereunder, processes (e.g., initial connection between the autonomous vehicle and the 5G network, and the like) necessary for 5G communications between the vehicle and the 5G network are briefly described with reference to FIGS. 2 to 6.

Figure 2:
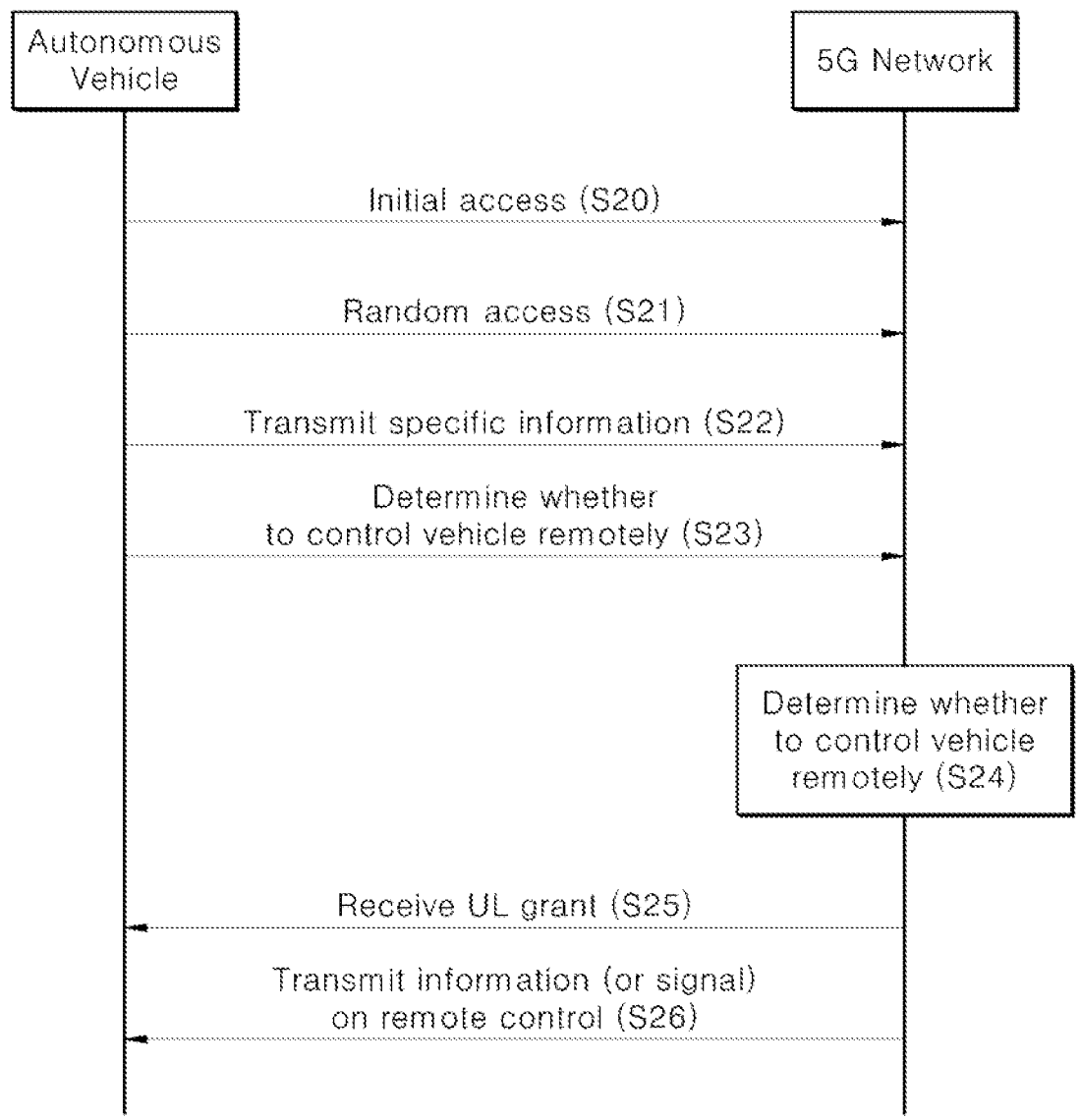
FIG. 2 is a view showing an example of application operation of an autonomous vehicle and a 5G network in a 5G communication system.

FIG. 2 is a view showing an example of application operation of an autonomous vehicle and a 5G network in a 5G communication system.

The autonomous vehicle may perform initial access to the 5G network (S20).

The initial access process may include cell searching for acquisition of downlink (DL) operation, obtaining system information, and the like.

Then the autonomous vehicle may perform random access to the 5G network (S21).

The random access process may include transmitting a preamble for acquisition of uplink (UL) synchronization or transmission of UL data, receiving a response to random access, and the like.

Then the 5G network may transmit a UL grant for scheduling transmission of specific information to the autonomous vehicle (S22).

Receiving the UL grant may include receiving time/frequency source scheduling for transmission of the UL data to the 5G network.

Then the autonomous vehicle may transmit the specific information to the 5G network, based on the UL grant (S23).

Then the 5G network may determine whether to control the autonomous vehicle remotely (S24).

Then the autonomous vehicle may receive a DL grant through a physical downlink control channel, to receive a response to specific information from the 5G network (S25).

Then the 5G network may transmit information (or signals) on remote control to the autonomous vehicle, based on the DL grant (S26).

Figure 3:
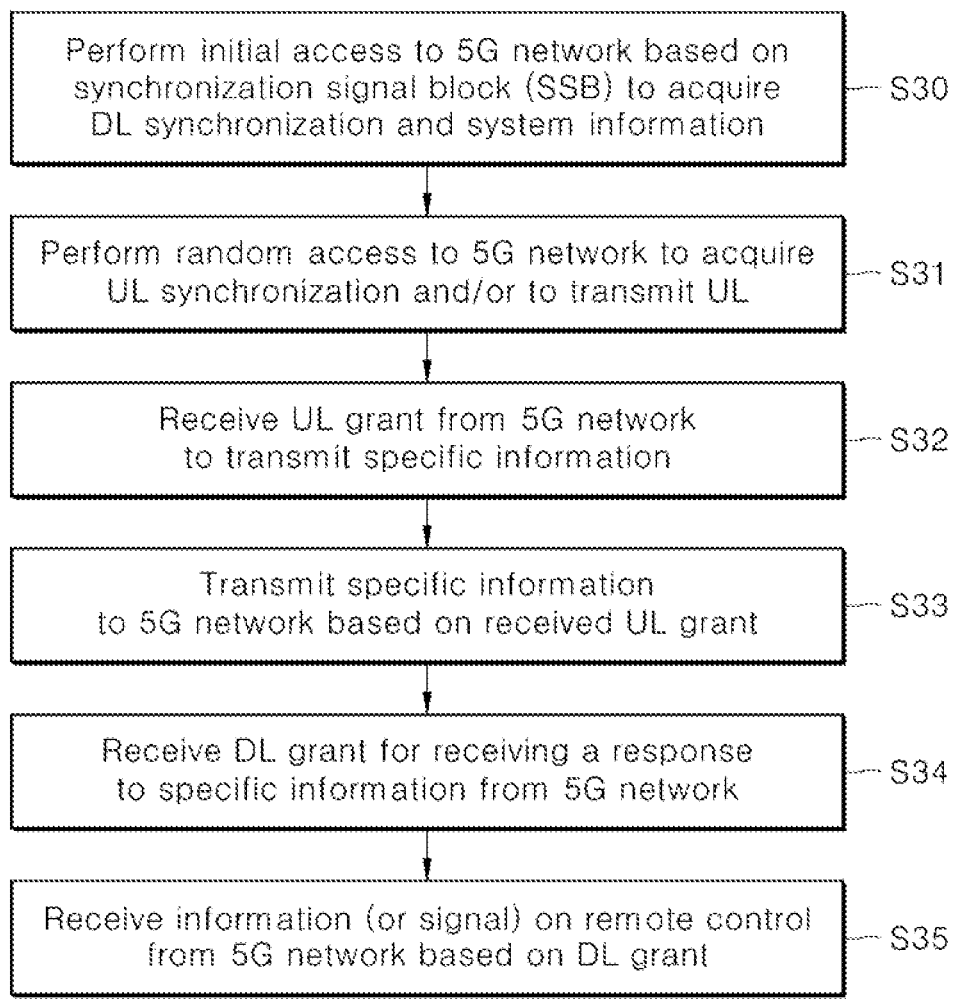
FIGS. 3 to 6 are views showing an example of operation of an autonomous vehicle using 5G communication.

In FIG. 3, an example in which the process of the initial access and/or the random access between the autonomous vehicle and the 5G network, and the process of the receipt of a downlink grant are combined is exemplarily described in steps S20 to S26, but the present disclosure is not limited thereto.

The initial access and/or the random access may be performed in steps S20, S22, S23, S24, and S25, for example. Additionally, the initial access and/or the random access may be performed in steps S21, S22, S23, S24, and S26, for example. Further, the process in which AI operation and the receipt of a downlink grant are combined may be performed in steps the initial access and/or the random access may be performed in steps S23, S24, S25, and S26.

In FIG. 2, an example of operation of the autonomous vehicle in steps S20 to S26 is shown, but not limited.

The operation of the autonomous vehicle may be performed based on a selective combination between steps S20, S21, S22, and S25 and steps S23, and S26, for example. Additionally, the operation of the autonomous vehicle may include steps S21, S22, S23, and S26, for example. Further, the operation of the autonomous vehicle may include steps S20, S21, S23, and S26, for example. Furthermore, the operation of the autonomous vehicle may include steps S22, S23, S25, and S26, for example.

FIGS. 3 to 6 are views showing an example of operation of an autonomous vehicle using 5G communication.

Referring to FIG. 3, the autonomous vehicle including an autonomous driving module may perform initial access to the 5G network, based on synchronization signal block (SSB), to acquire DL synchronization and system information (S30).

Then the autonomous vehicle may perform random access to the 5G network to acquire UL synchronization and/or to transmit UL (S31).

Then the autonomous vehicle may receive a UL grant from the 5G network, to transmit specific information (S32).

Then the autonomous vehicle may transmit specific information to the 5G network, based on the UL grant (S33).

Then the autonomous vehicle may receive a DL grant for receiving a response to specific information from the 5G network (S34).

Then the autonomous vehicle may receive information (or signals) on remote control from the 5G network, based on the DL grant (S35).

Step S30 may further include beam management (BM), step S31 may further include beam failure recovery in relation to transmission of a physical random access channel (PRACH), step S32 may further include a QCL relationship in relation to a beam receipt direction of PDCCH including the UL grant, and step S33 further includes a QCL relationship in relation to a beam transmission direction of a physical uplink control channel (PUCCH)/physical uplink shared channel (PUSCH) including the specific information. Additionally, step S34 may further include a QCL relationship in relation to a beam receipt direction of the PDCCH including the DL grant.

Figure 4:
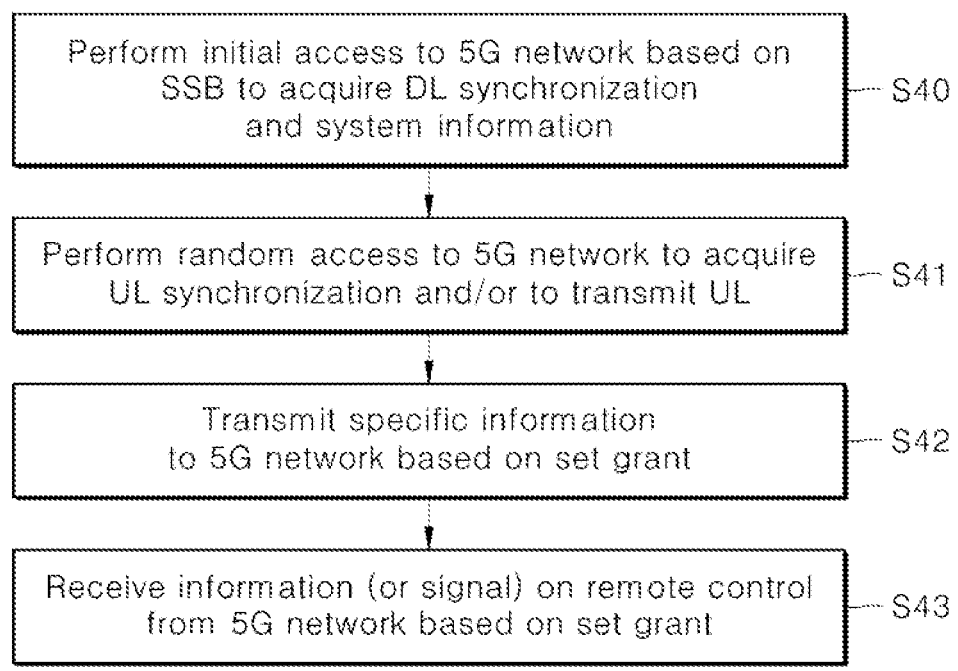

Referring to FIG. 4, the autonomous vehicle may perform initial access to the 5G network, based on SSB, to acquire DL synchronization and system information (S40).

Then the autonomous vehicle may perform random access to the 5G network, to acquire UL synchronization and/or to transmit UL (S41).

Then the autonomous vehicle may transmit specific information to the 5G network, based on a configured grant (S42). In other words, instead of receiving a UL grant from the 5G network, the autonomous vehicle may transmit specific information to the 5G network, based on the configured grant.

Then the autonomous vehicle may receive information (or signals) on remote control from the 5G network, based on the configured grant (S43).

Figure 5:
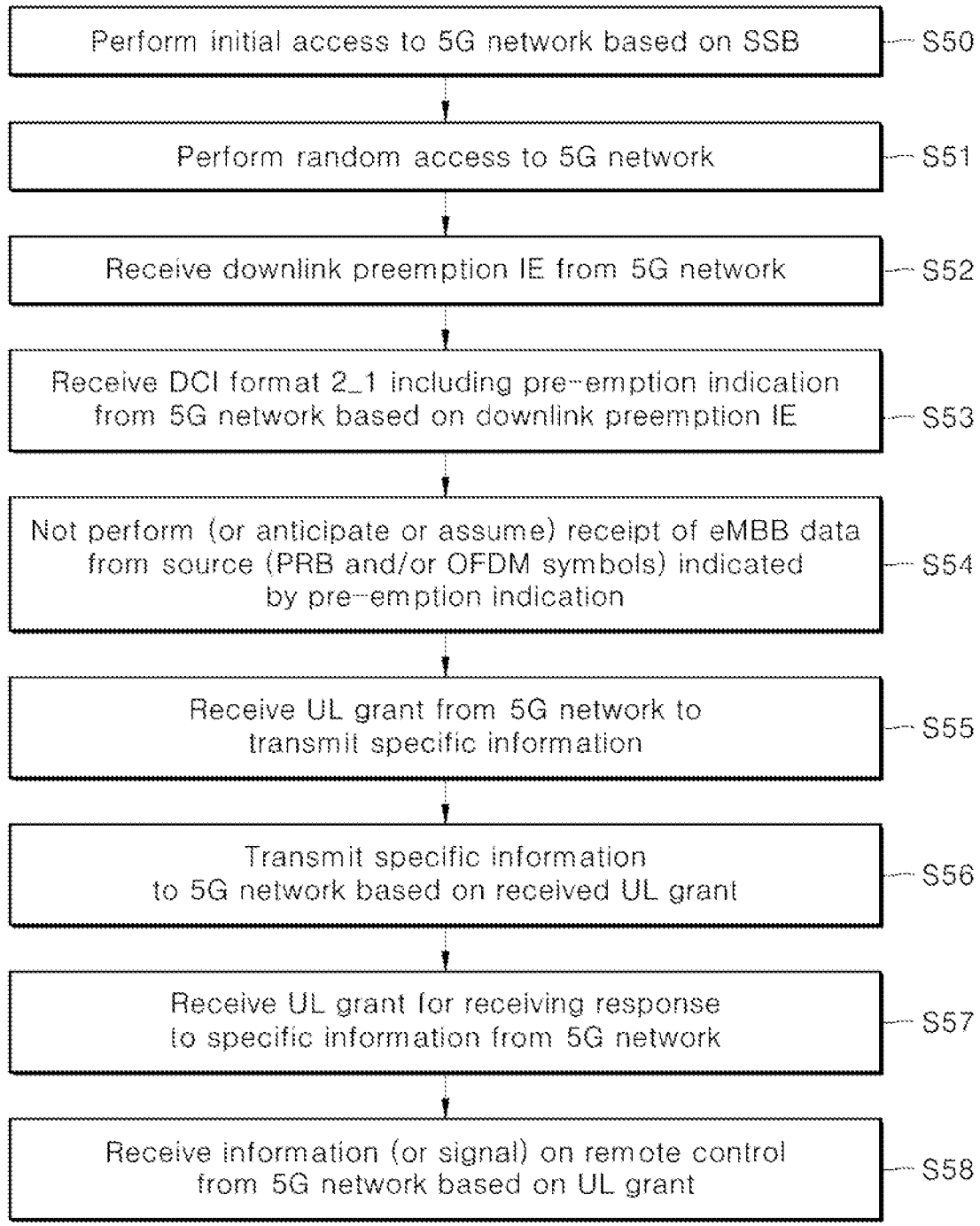

Referring to FIG. 5, the autonomous vehicle may perform initial access to the 5G network, based on SSB, to acquired DL synchronization and system information (S50).

Then the autonomous vehicle may perform random access to the 5G network, to acquire UL synchronization and/or to transmit UL (S51).

Then the autonomous vehicle may receive downlink preemption IE from the 5G network (S52).

Then the autonomous vehicle may receive DCI format 2_1 including a preemption instruction from the 5G network, based on the downlink preemption IE (S53).

Then the autonomous vehicle may not perform (or anticipate or assume) receipt of eMBB data from a source (PRB and/or OFDM symbols) indicated by pre-emption indication (S54).

Then the autonomous vehicle may receive a UL grant from the 5G network, to transmit specific information (S55).

Then the autonomous vehicle may transmit the specific information to the 5G network, based on the UL grant (S56).

Then the autonomous vehicle may receive a DL grant for receiving a response to the specific information from the 5G network (S57).

Then the autonomous vehicle may receive information (or signals) on remote control from the 5G network, based on the DL grant (S58).

Figure 6:
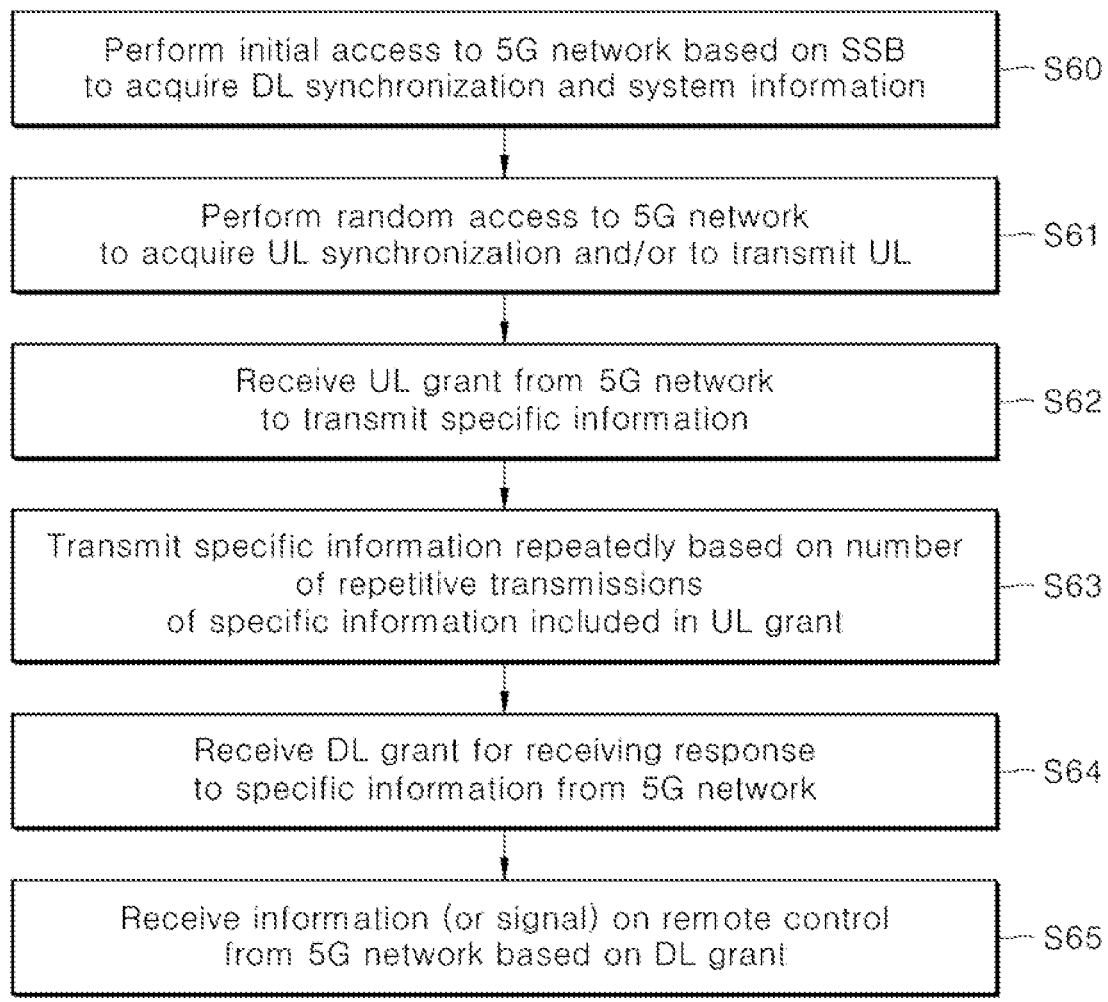

Referring to FIG. 6, the autonomous vehicle may perform initial access to the 5G network, based on SSB, to acquire DL synchronization and system information (S60).

Then the autonomous vehicle may perform random access to the 5G network, to acquire UL synchronization and/or to transmit UL (S61).

Then the autonomous vehicle may receive a UL grant from the 5G network, to transmit specific information (S62).

The UL grant may include information on the number of repetitive transmissions of specific information, and the specific information may be transmitted repeatedly based on the information on the number of repetitive transmissions (S63).

Then the autonomous vehicle may transmit the specific information to the 5G network, based on the UL grant.

The repetitive transmissions of specific information may be performed based on frequency hopping. First transmission of specific information may be transmitted from a first frequency source, and second transmission of specific information may be transmitted from a second frequency source.

The specific information may be transmitted through a narrowband of 6 resource block (RB) or 1 resource block (RB).

Then the autonomous vehicle may receive a DL grant for receiving a response to specific information from the 5G network (S64).

Then the autonomous vehicle may receive information (or signals) on remote control from the 5G network, based on the DL grant (S65).

The 5G communication technology described above may be applied to details provided hereafter, and may help to specify and clarify technical features of methods presented in the disclosure. Additionally, the autonomous vehicle's data communication method described below is not limited to the above-described communication method using a 5G network, and the autonomous vehicle may perform data communication by using various methods that are used in the art.

Hereunder, a travel subsidiary system of the autonomous vehicle in one embodiment, and a method of the autonomous vehicle's travel in the system are described with reference to FIGS. 7 to 14.

Figure 7:
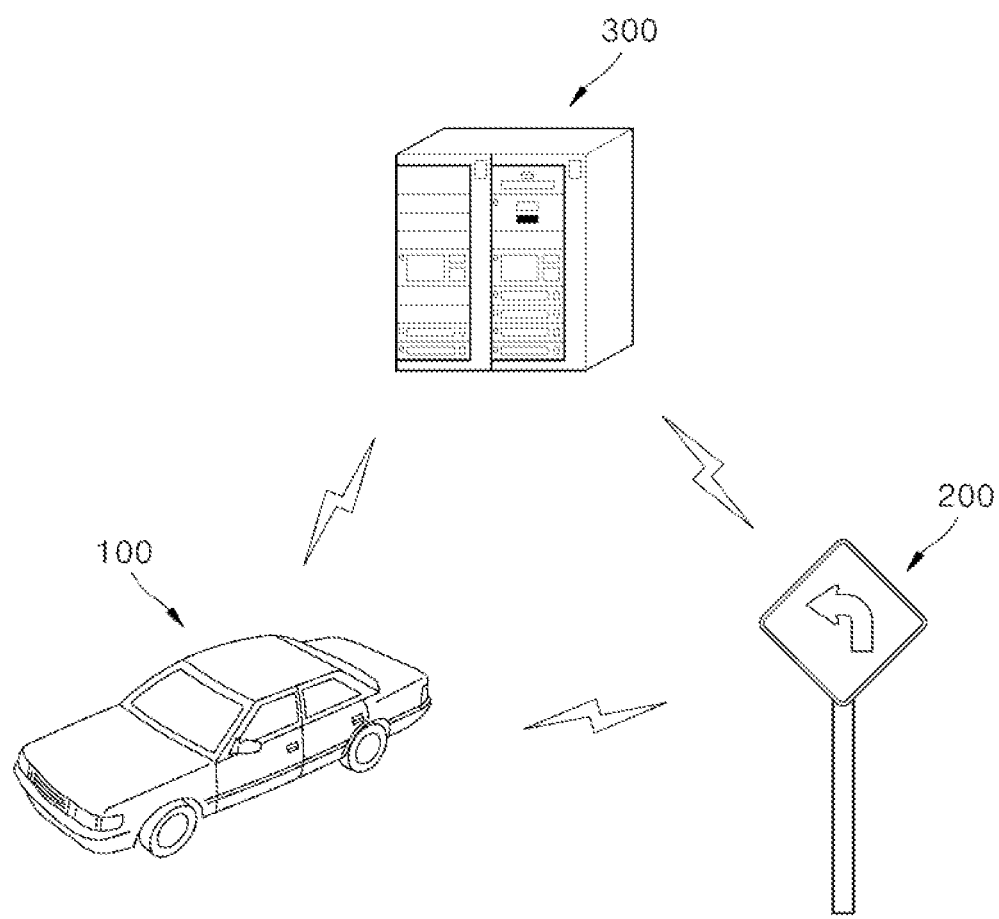
FIG. 7 is a view showing a travel subsidiary system of an autonomous vehicle in one embodiment.
Figure 8:
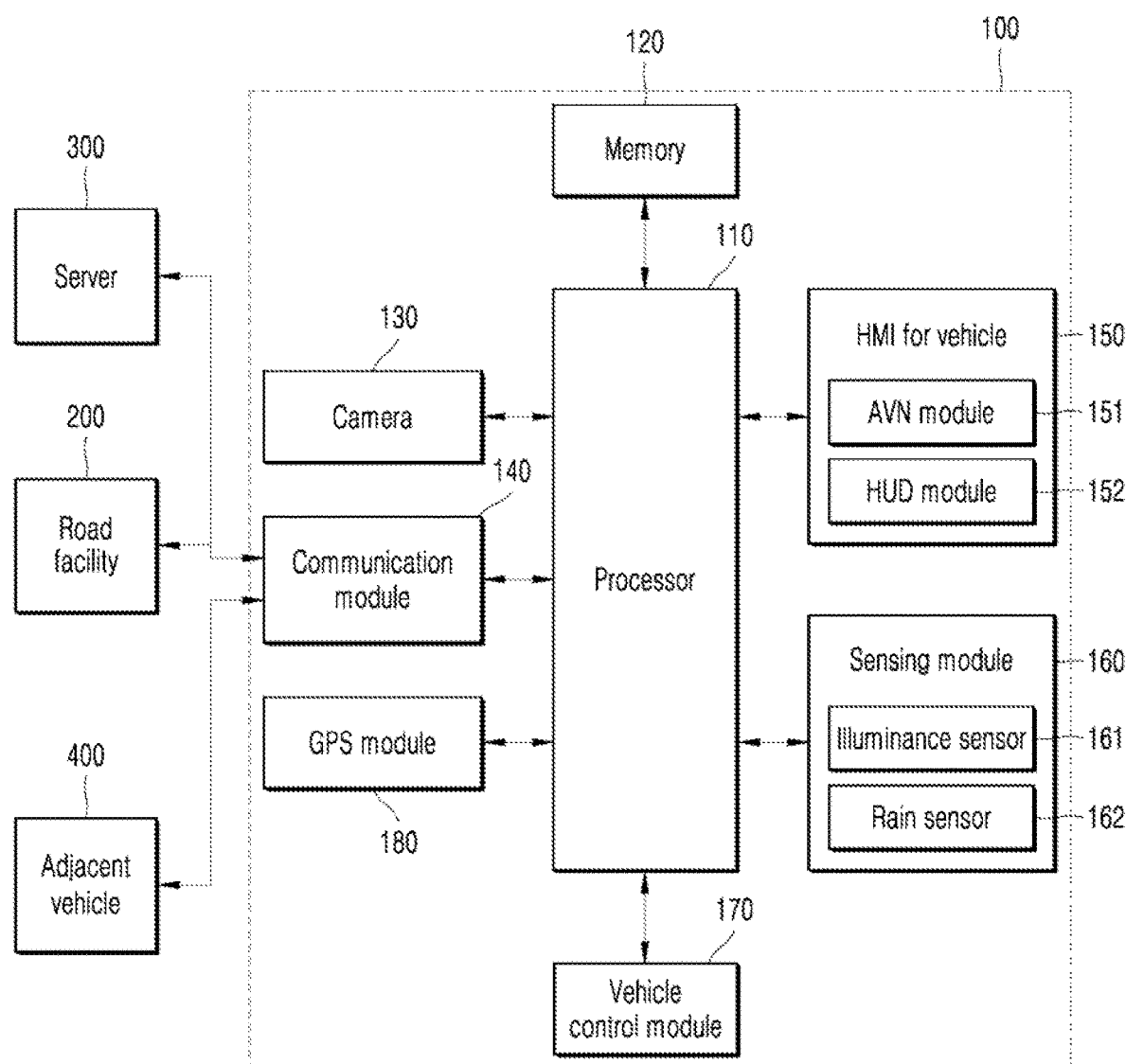
FIG. 8 is a view showing an inner configuration of the autonomous vehicle in FIG. 7.

FIG. 7 is a view showing a travel subsidiary system of an autonomous vehicle in one embodiment, and FIG. 8 is a view showing an inner configuration of the autonomous vehicle in FIG. 7.

Figure 9:
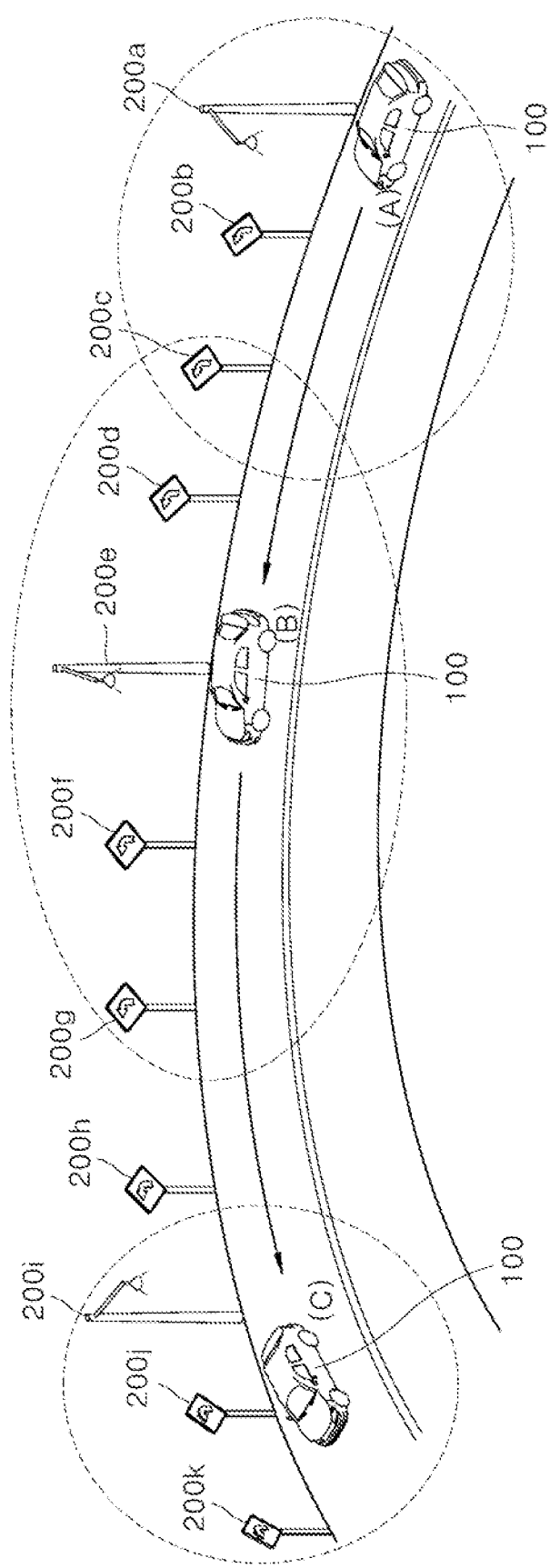
FIG. 9 is a view for describing data communications between an autonomous vehicle and a plurality of road facilities while the autonomous vehicle is traveling.
Figure 10:
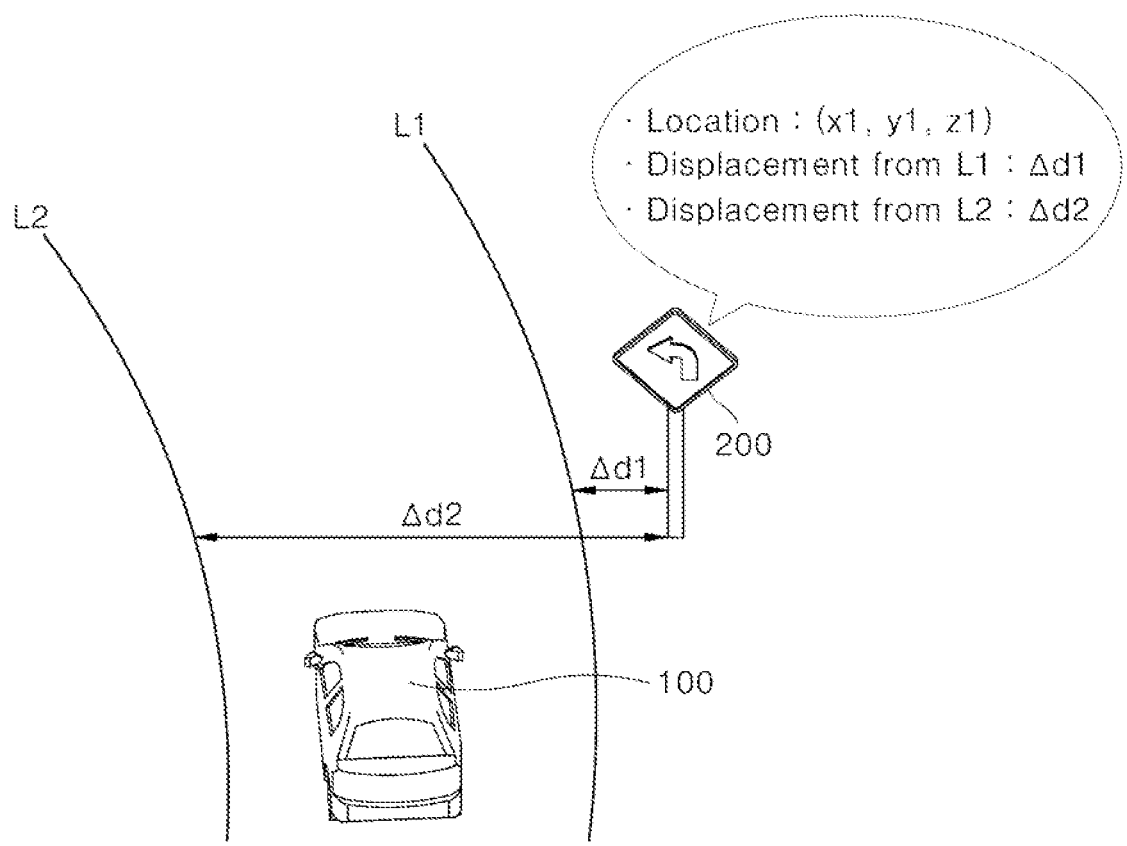
FIG. 10 is a view for describing a location parameter corresponding to a road facility.
Figure 11:
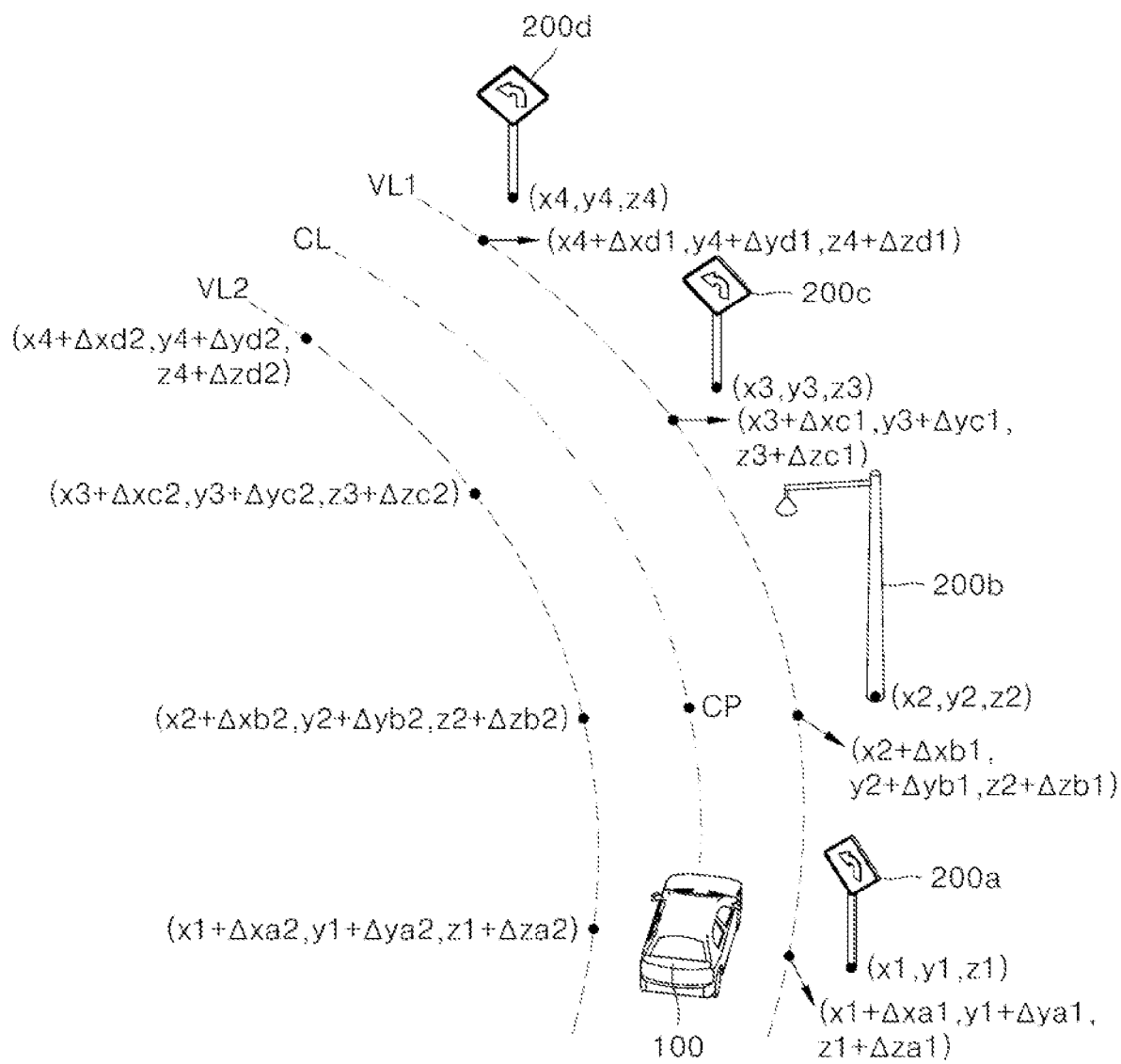
FIG. 11 is a view for describing a process of generating a virtual lane, based on a location parameter.

FIG. 9 is a view for describing data communications between an autonomous vehicle and a plurality of road facilities while the autonomous vehicle is traveling. FIG. 10 is a view for describing a location parameter corresponding to a road facility. FIG. 11 is a view for describing a process of generating a virtual lane, based on a location parameter.

Figure 12:
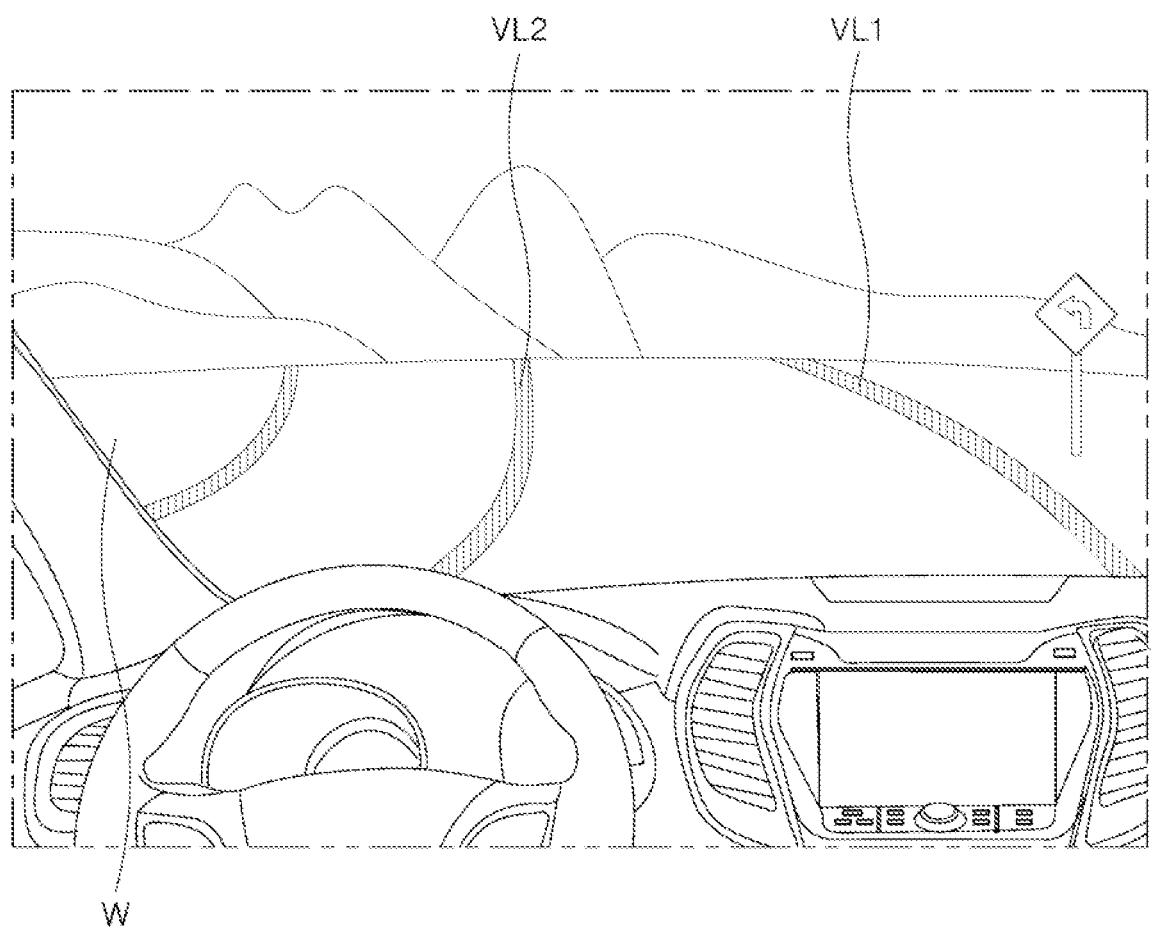
FIG. 12 is a view showing a head up display (HUD) module projecting a virtual lane onto a windshield.
Figure 13:
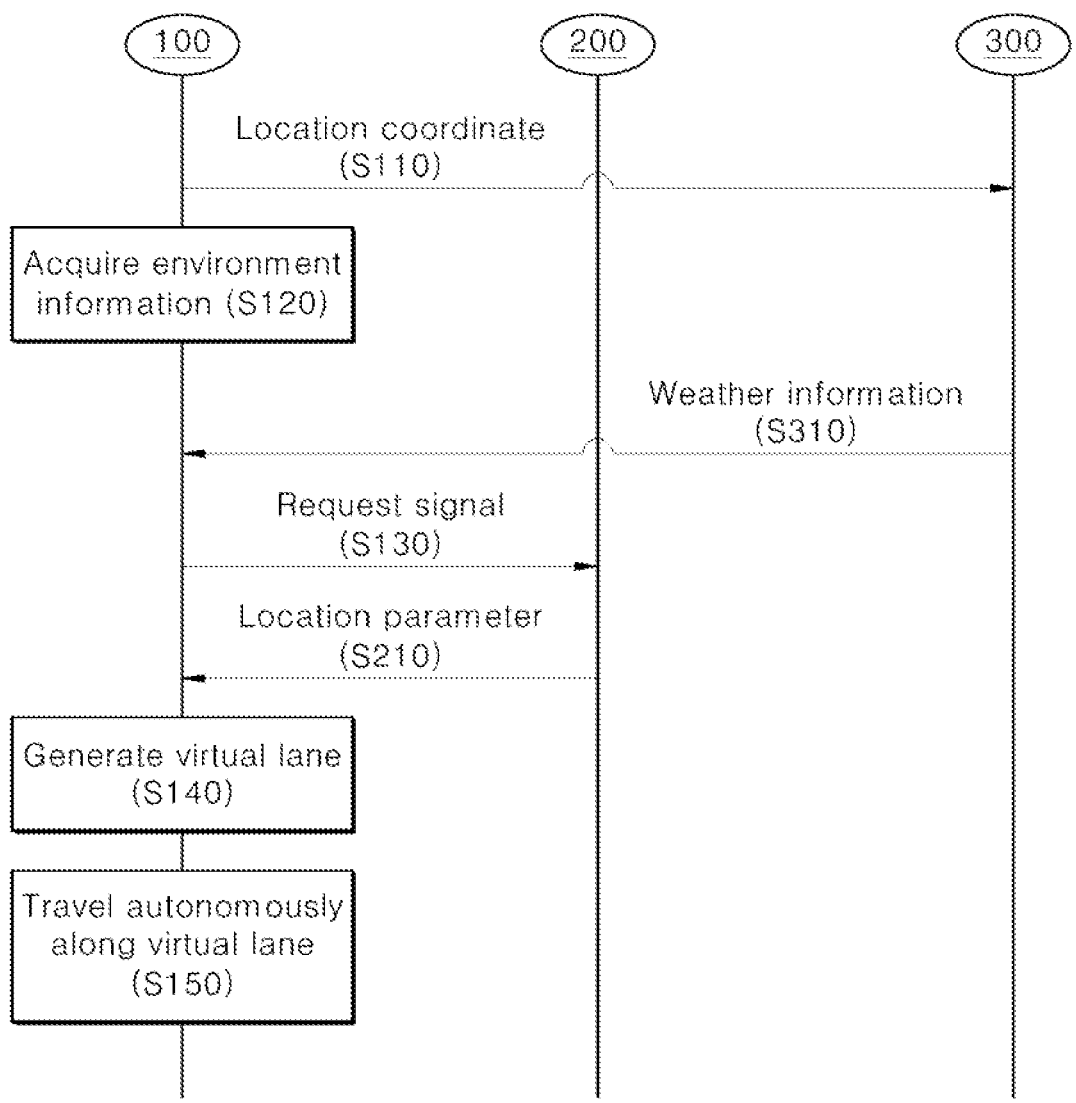
FIGS. 13 and 14 are flow charts respectively showing an example of a travel method of an autonomous vehicle.
Figure 14:
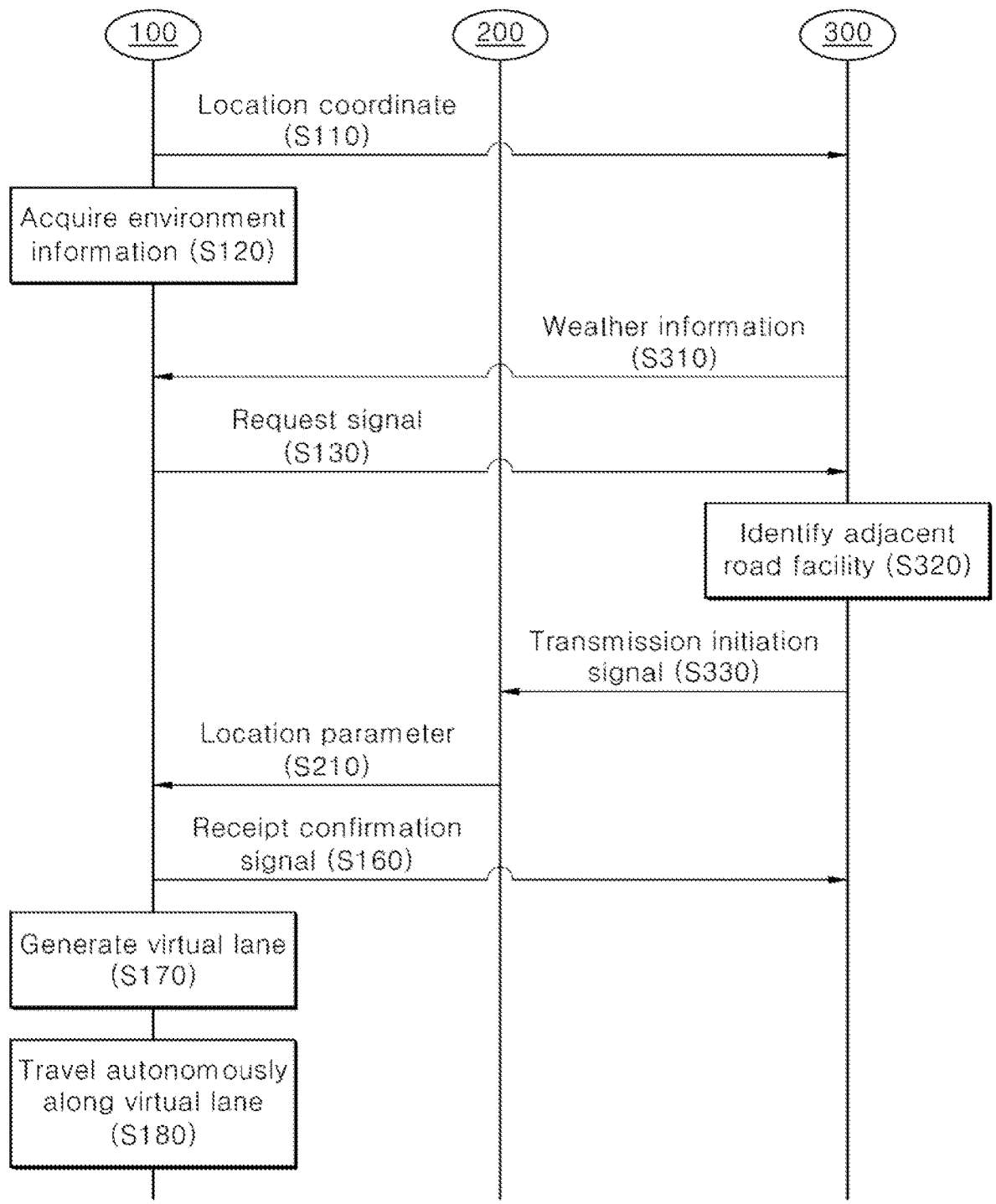

FIG. 12 is a view showing a head up display (HUD) projecting a virtual lane onto a windshield. FIGS. 13 and 14 are flow charts respectively showing an example of a travel method of an autonomous vehicle.

Referring to FIG. 7, the travel subsidiary system of the autonomous vehicle in one embodiment (hereinafter, a travel subsidiary system) may include an autonomous vehicle 100, a road facility 200, and a server 300. The travel subsidiary system in FIG. 1 is provided as one embodiment, and components are not limited to those of the embodiment in FIG. 7. When necessary, some components may be added, modified or removed.

The autonomous vehicle 100, the road facility 200 and the server 300 constituting the travel subsidiary system may connect to one another through a wireless network and perform data communications mutually. Each of the components may use a 5G mobile communication serve for data communications. A method of data communications using a 5G network is described above with reference to FIGS. 1 to 6. Thus, detailed description in relation to this is omitted.

In the disclosure, the autonomous vehicle 100 may be any vehicle capable of autonomously traveling to a destination along a virtual lane without a driver's interference.

The autonomous vehicle 100 may be implemented as an internal combustion engine vehicle provided with an engine as a power source, a hybrid vehicle provided with an engine and an electric motor as power sources, an electric vehicle provided with an electric motor as a power source, a fuel cell electric vehicle provided with a fuel cell as a power source, and the like.

Additionally, the autonomous vehicle 100 may be linked to any artificial intelligence module, a drone, an unmmaned aerial vehicle, a robot, an augmented reality (AR) module, a virtual reality (VR) module, a 5G mobile communication device, and the like.

The road facility 200 may be a facility fixedly installed for convenience of drivers or pedestrians. The road facility 200 may include a sign, a street light, a stop, a toilet, a vending machine, a traffic light, a traffic control tower, a fire hydrant, and the like. The road facility 200 may be provided with a communication device for data communications with the autonomous vehicle 100 and the server 300.

The server 300 may provide information to the autonomous vehicle 100 and the road facility 200 that connect through a wireless network, or store and manage information collected from the autonomous vehicle 100 and the road facility 200. The server 300 may be operated by a transportation company that runs the autonomous vehicle 100, or by a local government or a country that manages the road facility 200, or by a telecommunication company that broadcasts data between the transportation company and the local government or the country.

Hereunder, an operation method of the autonomous vehicle 100 in the travel subsidiary system described above is described.

Referring to FIG. 8, the autonomous vehicle 100 in one embodiment may include a processor 110, a memory 120, a camera 130, a communication module 140, a human machine interface (HMI) for a vehicle 150, a sensing module 160, a vehicle control module 170 and a global positioning system (GPS) module 180. The components in the autonomous vehicle 100 of FIG. 8 are provided as examples, and components are not limited to the components illustrated in FIG. 8. When necessary, some components may be added, modified or removed.

Each of the components in the autonomous vehicle 100 may be implemented as a physical element including at least one of application specific integrated circuits (ASICs), digital signal processors (DSPs), digital signal processing devices (DSPDs), programmable logic devices (PLDs), field programmable gate arrays (FPGAs), controllers, micro-controllers, and microprocessors.

Operation of each of the components in FIG. 8 may be controlled by the processor 110, and the processor 110 may process data acquired from each of the components or data provided to each of the components. The memory 120 may be comprised of ROM, RAM, EPROM, flash drive, hard drive and the like, and store programs for operation of the above-described processor 110 and various types of data for entire operation of the autonomous vehicle 100.

Hereunder, an operation process of the autonomous vehicle 100 is described with reference to the components in FIG. 8.

The autonomous vehicle 100 may transmit a request signal through a wireless network.

Specifically, the communication module 140 may transmit a request signal based on control by the processor 110 under specific conditions. Herein, the request signal may denote a signal that requests a location parameter described below.

Additionally, the communication module 140 may receive a location parameter of a road facility 200 near the communication module 140 from the road facility 200, in response to the request signal.

The road facility 200 may include a communication device and a storage device in which a location parameter is stored in advance. The location parameter may include information on a location of a road facility 200. Detailed description in relation to the location parameter is provided below. The road facility 200 may transmit a location parameter stored in the storage device to the communication module 140 of the autonomous vehicle 100 through the communication device.

Hereunder, two scenarios of communication between the autonomous vehicle 100 and the road facility 200 are provided as examples.

In one example, the communication module 140 may emit a request signal to a wireless network, and the request signal may spread to a space around the autonomous vehicle 100. Accordingly, a road facility 200 (hereinafter, an adjacent road facility 200) within a predetermined distance from the autonomous vehicle 100 may receive the request signal, on the wireless network.

Specifically, the communication module 140 may transmit a request signal through at least one of local area networks such as Bluetooth, Beacon and Wi-Fi. Thus, a road facility 200 connected onto at least one of local area networks such as Bluetooth, Beacon and Wi-Fi may receive the request signal.

Referring to FIG. 9, while the autonomous vehicle 100 is traveling at location A, three road facilities 200a, 200b, 200c near the autonomous vehicle 100 may receive the request signal. When the autonomous vehicle 100 moves to location B, five road facilities 200c, 200d, 200e, 200f, 200e near the autonomous vehicle 100 may receive the request signal. When the autonomous vehicle 100 moves to location C, three road facilities 200i, 200j, 200k near the autonomous vehicle 100 may receive the request signal.

The road facility 200 near the autonomous vehicle 100 may transmit a location parameter to the autonomous vehicle 100 in response to the received request signal, and accordingly, the communication module 140 of the autonomous vehicle 100 may receive the location parameter.

In another example, the communication module 140 may transmit a request signal to the server 300 directly. The server 300 may transmit a transmission initiation signal to at least one road facility 200 that is within a predetermined distance from a location coordinate of the autonomous vehicle 100, in response to the received request signal.

The GPS module 180 in the autonomous vehicle 100 may interpret a signal output from an artificial satellite to acquire a coordinate (hereinafter, a location coordinate) at which the GPS module 180 is located. Since the GPS module 180 is built into the autonomous vehicle 100, a location coordinate acquired by the GPS module 180 may be a location coordinate of the autonomous vehicle 100.

The communication module 140 may transmit a location coordinate that is acquired by the GPS module 180 in real time, to the server 300. When receiving a request signal, the server 300 may identify at least one road facility 200 that is within the predetermined distance from the location coordinate. Specifically, the server 300 may be provided with data base in which a three-dimensional location coordinate of the road facility 200 is stored, and compare the location coordinate of the autonomous vehicle 100 with the three-dimensional location coordinate of the road facility 200 with reference to the database, to identify the road facility 200 that is within the predetermined distance from the autonomous vehicle 100.

Referring back to FIG. 9, while the autonomous vehicle 100 is traveling in position A, the server 300 may identify three road facilities 200a, 200b, 200c that are within a predetermine distance from a location coordinate of the autonomous vehicle 100. When the autonomous vehicle 100 is moved to position B, the server 300 may identify five road facilities 200c, 200d, 200e, 200f, 200e that are within a predetermined distance from a location coordinate of the autonomous vehicle 100. When the autonomous vehicle 100 is moved to position C, the server 300 may identify three road facilities 200i, 200j, 200k that are within a predetermined distance from a location coordinate of the autonomous vehicle 100.

Having identified the road facility 200, the server 300 may transmit a transmission initial signal to the road facility 200. The transmission initiation signal may be a signal for controlling the road facility 200 such that road facility 200 starts to transmit a location parameter.

The road facility 200 may transmit a location parameter to the autonomous vehicle 100 in response to the transmission initiation signal received from the server 300. Accordingly, the communication module 140 of the autonomous vehicle 100 may receive the location parameter.

The transmission of a request signal and the receipt of a location parameter, described above, may be performed under specific conditions.

The autonomous vehicle 100 may travel depending on travel modes, and the travel modes may be divided into a manual mode and an autonomous mode. In the manual mode, the autonomous vehicle 100 may travel under the control of a driver, and in the autonomous mode, travel autonomously along a virtual lane.

Specifically, in the autonomous mode, the autonomous vehicle 100 may identify a lane of a road on which the autonomous vehicle 100 travels, generate a virtual lane corresponding to the identified lane, and then travel while tracking the generated virtual lane.

Since the location parameter is used to generate the virtual lane as described below, the autonomous vehicle 100 may transmit a request signal only in the autonomous mode.

To determine a travel mode, the autonomous vehicle 100 may receive a travel mode from a user through the HMI for a vehicle 150.

The HMI for a vehicle 150 may be disposed in the vehicle, and basically output information and a state of the autonomous vehicle 100 to the user acoustically and visually through a plurality of physical interfaces. To this end, the HMI for a vehicle 150 according to the disclosure may include an audio video navigation (AVN) module 151, and a head up display (HUD) module 152.

The AVN module 151 may include a speaker and a display, and output the information and state of the autonomous vehicle 100 acoustically through the speaker or visually through the display.

The HUD module 152 may project an image onto a windshield W provided on the front surface of the vehicle such that the driver sees the projected image while watching ahead.

The HMI for a vehicle 150 may include a touch sensor that senses the user's touch input, to receive the user's instruction, and the touch sensor may be built into the display in the AVN module 151.

The HMI for a vehicle 150 may provide an interface for receiving a travel mode through the display, and the driver may input a travel mode on the interface, based on a touch input.

When the user inputs an autonomous mode, the communication module 140 may transmit a request signal, as described above.

In a state in which the autonomous vehicle can identify a lane, a virtual lane may be generated along the identified lane. Accordingly, the communication module may not receive a location parameter additionally. Thus, the autonomous vehicle 100 may transmit a request signal in a state in which the autonomous vehicle cannot identify a lane.

Specifically, the autonomous vehicle 100 may acquire environment information, and when ascertaining it is impossible to generate a virtual lane based on the environment information acquired, transmit a request signal.

The environment information may be information on the environment outside the autonomous vehicle 100, and include information that is needed for generation of a virtual lane, and information that interferes with identification of a virtual lane. In other words, the autonomous vehicle 100 may or may not identify a lane, because of the environment information in the autonomous mode.

The autonomous vehicle 100 may acquire the environment information through the camera 130 and the sensing module 160, and may ascertain a lane identification state is an identifiable state or a non-identifiable state based on the environment information acquired. When ascertaining the lane identification state is a non-identifiable state, the autonomous vehicle 100 may transmit a request signal.

In one example, the environment information may be an external image. In this case, the autonomous vehicle 100 may acquire an external image, based on a capturing operation of the camera 130. Then the autonomous vehicle 100 may identify an object corresponding to a lane from the external image captured.

Specifically, the camera 130 with which the autonomous vehicle 100 is provided may capture an external image in front of the autonomous vehicle 100, and the processor 110 may analyze the external image captured and identify an object in the external image. For example, when a lane is included in the external image captured by the camera 130, the processor 110 may identify an object corresponding to the lane in the external image.

However, lanes may not be shown in the external image, in cases in which lane markings are erased, or in which lane markings are covered by an external object, and the like. In this case, the processor 110 may not identify an object corresponding to the lane.

Thus, when an object corresponding to the lane is not acquired, the autonomous vehicle 100 may transmit a request signal. Specifically, when an object corresponding to the lane is not identified in the external image, the processor 110 may ascertain the lane identification state is a non-identifiable state, and control the communication module 140 such that the communication module 140 transmits a request signal.

In another example, the environment information may be an external illuminance value. In this case, the autonomous vehicle 100 may acquire an external illuminance value through an illuminance sensor 161.

The illuminance sensor 161 with which the autonomous vehicle 100 is provided may sense external illuminance, and detect an external illuminance value that indirectly indicates the driver's external visual field.

When the driver drives at night or in fog, an external illuminance value may be low. Accordingly, it may be impossible to identify a lane through the camera 130.

To prevent this from happening, when the external illuminance value acquired by the illuminance sensor 161 is less than a reference illuminance value, the autonomous vehicle 100 may transmit a request value. Specifically, the processor 110 may compare the external illumiance value that is acquired by the illuminance sensor 161 with the reference illuminance value that is stored in the memory 120 in advance. When the external illuminance value is less than the reference illuminance value as a result of the comparison, the processor 110 may ascertain the lane identification state is a non-identifiable state, and control the communication module 140 such the communication module transmits a request signal.

In yet another embodiment, the environment information may be a rain amount. In this case, the autonomous vehicle 100 may acquire a rain amount through the rain sensor 162.

The rain sensor 162 with which the autonomous vehicle 100 is provided may sense rain, snow, and the like, and detect a rain amount that indirectly indicates the driver's external visual field.

Under bad weather conditions such as heavy snow, heavy rain, and the like, a rain amount may be great. Accordingly, it may be impossible to identify a lane through the camera 130.

To prevent this from happening, when the rain amount acquired by the rain sensor 162 is a reference rain amount or greater, the autonomous vehicle 100 may transmit a request signal. Specifically, the processor 110 may compare the rain amount that is acquired by the rain sensor 162 with the reference rain amount that is stored in the memory 120 in advance. When the rain amount is the reference rain amount or greater as a result of the comparison, the processor 110 may ascertain the lane identification state is a non-identifiable state, and control the communication module 140 such that the communication module 140 transmits a request signal.

Additionally, the autonomous vehicle 100 may transmit a request signal depending on weather information in addition to the environment information described above.

The autonomous vehicle 100 may receive weather information corresponding to its location coordinate from the server 300. The autonomous vehicle 100, as described above, may transmit the location coordinate acquired by the GPS module 180 to the server 300 in real time.

The server 300 may identify weather information corresponding to the received location coordinate, and transmit the identified weather information to the autonomous vehicle 100. Specifically, the server 300 may identify real-time weather information corresponding to the location coordinate of the autonomous vehicle 100 with reference to database, and transmit the identified weather information to the autonomous vehicle 100. Alternatively, the server 300 may receive weather information corresponding to the location coordinate of the autonomous vehicle 100 from an external weather information server, and transmit the received weather information to the autonomous vehicle 100.

The autonomous vehicle 100 may transmit a request signal, based on the weather information received from the server 300.

The weather information may include various types of information such as a visible distance, a fine duct concentration, a precipitation amount, a snowfall and the like. The processor 110 in the autonomous vehicle 100 may compare the weather information that is received from the server 300 with a reference value that is stored in the memory 120, and determine whether to transmit a request signal.

For example, when the visible distance is less than a reference visible distance, or the fine dust concentration is a reference concentration or greater, or the precipitation amount is a reference precipitation amount or greater, or the snowfall is a reference snowfall or greater, the processor 110 may control the communication module 140 such that the communication module 140 transmits a request signal.

When the request signal is transmitted under the conditions, an adjacent road facility 200 may transmit a location parameter to the autonomous vehicle 100 in response to the request signal, as described above.

The autonomous vehicle 100 may generate a virtual lane, based on the location parameter received from the road facility 200.

The location parameter may include any information on the position of the road facility 200. For example, the location parameter may include a three-dimensional location coordinate of the road facility 200, and three-dimensional displacement between the road facility 20 and a plurality of adjacent lanes. In addition, the location parameter may further include a distance to another adjacent road facility 200, a bending degree to another adjacent road facility 200, a distance between adjacent lanes and the like.

Hereafter, suppose that the location parameter includes a three-dimensional location coordinate of the road facility 200, and three-dimensional displacement between the road facility 200 and a plurality of adjacent lanes. The three-dimensional displacement may be defined as minimum displacement between the road facility 200 and the plurality of lanes.

Referring to FIG. 10, the location parameter of the road facility 200 may include a three-dimensional location coordinate $(x1, y1, z1)$ of the road facility 200, three-dimensional displacement $\Delta d1$ between the road facility 200 and a nearest lane L1, and three-dimensional displacement $\Delta d2$ between the road facility 200 and a second nearest lane L2. Though not illustrated in the drawings, when there is a lane that is a third nearest to the road facility 200, the location parameter may also include three-dimensional displacement between the road facility 200 and the lane.

The road facility 200 may transmit a location parameter to the autonomous vehicle 100, as described above.

The autonomous vehicle 100 may identify a coordinate of a virtual lane, based on the three-dimensional location coordinate of the road facility 200, and the three-dimensional displacement between the road facility 200 and the plurality of adjacent lanes.

Referring to FIG. 11, the autonomous vehicle 100 traveling may receive a location parameter consecutively from first to fourth road facilities 200a-200d.

A three-dimensional location coordinate received from the first road facility 200a may be $x1, y1, z1$, three-dimensional displacement between the first road facility 200a and a nearest lane (hereinafter, a first lane L1) may be $\Delta xa1, \Delta ya1, \Delta za1$, and three-dimensional displacement between the first road facility 200a and a second nearest lane (hereinafter, a second lane L2) may be $\Delta xa2, \Delta ya2, \Delta za2$.

The processor 110 may apply the three-dimensional displacement in relation to each lane to the three-dimensional location coordinate of the first road facility 200a, to determine a first coordinate of a virtual lane (hereinafter, a first virtual lane VL1) corresponding to the first lane L1 as $x1+\Delta xa1, y1+\Delta ya1, z1+\Delta za1$ and a first coordinate of a virtual lane (hereinafter, a second virtual lane VL2) corresponding to the second lane L2 as $x1+\Delta xa2, y1+\Delta ya2, z1+\Delta za2$.

Then a three-dimensional location coordinate received from the second road facility 200b may be $x2, y2, z2$, three-dimensional displacement between the second road facility 200b and the first lane L1 may be $\Delta xb1, \Delta yb1, \Delta zb1$, and three-dimensional displacement between the second road facility 200b and the second lane L2 may be $\Delta xb2, \Delta yb2, \Delta zb2$.

The process 110 may apply the three-dimensional displacement in relation to each lane to the three-dimensional location coordinate of the second road facility 200b, to determine a second coordinate of the first virtual lane VL1 as $x2+\Delta xb1, y2+\Delta yb1, z2+\Delta zb1$ and a second coordinate of the second virtual lane VL2 as $x2+\Delta xb2, y2+\Delta yb2, z2+\Delta zb2$.

Using this method, the processor 110 may receive a location parameter from the third and fourth road facilities 200c, 200d, and determine third and fourth coordinates of the first virtual lane VL1 as $x3+\Delta xc1, y3+\Delta yc1, z3+\Delta zc1$ and $x4+\Delta xd1$ and $y4+\Delta yd1, z4+\Delta zd1$ respectively and third and fourth coordinates of the second virtual lane VL2 as $x3+\Delta xc2, y3+\Delta yc2, z3+\Delta zc2$ and $x4+\Delta xd2, y4+\Delta yd2, z4+\Delta zd2$ respectively.

When the first to fourth coordinates in relation to each of the first and second virtual lanes VL1, VL2 are determined, the processor 110 may connect the coordinates and generate the first and second virtual lanes VL1, VL2. For example, the processor 110 may calculate a coefficient of an $n^{th}$ curve such that the $n^{th}$ curve corresponding to each of the virtual lanes VL1, VL2 passes through the coordinates determined above, and generate the first and second virtual lanes VL1, VL2. Various methods being used in the art to which the disclosure relates may be used as the method of connecting coordinates.

In the above method of generating a virtual lane, accuracy in generation of a virtual lane may improve such that the autonomous vehicle receives location parameters from a large number of road facilities 200 during travel. However, a rate at which a location parameter is received may decrease due to various external factors.

In one example, the rate at which a location parameter is received may vary depending on weather conditions. In this case, the autonomous vehicle 100 may receive a location parameter of a road facility 200, depending on a reference cycle that is set based on the weather conditions received from the server 300.

As describe above, the weather information may include various types of information, indicated as numbers, such as a visible distance, a fine duct concentration, a precipitation amount, a snowfall and the like. The autonomous vehicle 100 may compare the weather information with a reference value stored in the memory 120. When a rate of receipt of electric waves (e.g., when a precipitation amount or a snowfall is a reference value or greater) is low, the autonomous vehicle 100 may receive a location parameter in a short reference cycle. On the contrary, when a rate of receipt of electric waves is high, the autonomous vehicle 100 may receive a location parameter in a long reference cycle.

In another example, the rate at which a location parameter is received may vary depending on the number of adjacent vehicles. In this case, the autonomous vehicle 100 may receive a location parameter of a road facility 200, in a reference cycle that is set based on the number of adjacent vehicles.

The autonomous vehicle 100 may connect to the adjacent vehicles through vehicle to vehicle (V2V) communication, on the same network. Accordingly, the autonomous vehicle 100 may identify the number of adjacent vehicle, based on the number of nodes connected onto the network.

When there are a large number of reception nodes within a predetermined range in wireless communication, a receipt rate of each node may decrease. Accordingly, the autonomous vehicle 100 may compare the number of adjacent vehicles with a reference value, and when the number of adjacent vehicles is greater than the reference value, the autonomous vehicle 100 may receive a location parameter in a short reference cycle. On the contrary, when the number of adjacent vehicles is the reference value or less, the autonomous vehicle 100 may receive a location parameter in a long reference cycle. The autonomous vehicle 100 may also receive a location parameter in a reference cycle that is inversely proportional to the number of adjacent vehicles.

In yet another example, the rate at which a location parameter is received may vary depending on a travel speed of the autonomous vehicle 100. In this case, the autonomous vehicle 100 may receive a location parameter of a road facility 200 in a reference cycle that is set based on a travel speed.

Since time taken to receive a location parameter when the autonomous vehicle 100 travels at a high speed may be less than time taken to receive a location parameter when the autonomous vehicle 100 travels at a low speed, the rate at which a location parameter is received when the autonomous vehicle 100 travels at a high speed may be lower than the rate at which a location parameter is received when the autonomous vehicle 100 travels at a low speed. Thus, the autonomous vehicle 100 may receive a location parameter in a reference cycle that is inversely proportional to a travel speed. For example, as the travel speed increases, the autonomous vehicle 100 may receive a location parameter in a short reference cycle, and as the travel speed decreases, the autonomous vehicle 100 may receive a location parameter in a long reference cycle.

Additionally, each virtual lane is generated as a result of a connection of a coordinate determined by a location parameter of each road facility 200. When a road has a sharp curve, a location parameter needs to be received at a high rate, to improve the accuracy in generation of a virtual lane.

Thus, the autonomous vehicle 100 may receive a location parameter of a road facility 200 in a reference cycle that is set based on curvature of the autonomous vehicle's travel road.

The processor 110 in the autonomous vehicle 100 may calculate curvature of a road on which the autonomous vehicle travels currently, based on map information that is stored in the memory 120. The autonomous vehicle 100 may receive a location parameter in a reference cycle that is inversely proportional to the calculated curvature. For example, as curvature of a travel road increases, the autonomous vehicle 100 may receive a location parameter in a short reference cycle, and as curvature of a travel road decreases, the autonomous vehicle 100 may receive a location parameter in a long reference cycle.

The processor 110 may determine a reference cycle as in the above-described embodiments, and control the communication module 140 such that the communication module 140 receives a location parameter in the reference cycle.

As described above, the autonomous vehicle according to the disclosure may receive a location parameter in a short cycle at a low receipt rate, and receive a location parameter in a long cycle at a high receipt rate.

Further, when receiving no location parameter for a predetermined period, the autonomous vehicle 100 may change a travel mode to the manual mode.

As described above, the autonomous vehicle 100 may transmit a request signal in the autonomous mode of its travel mode. However, when no road facility 200 is not around a road on which the autonomous vehicle 100 travels, the autonomous vehicle 100 may not receive a location parameter.

When receiving no location parameter, the autonomous vehicle 100 may not generate a virtual lane, and when the autonomous vehicle autonomously travels in a state in which the virtual lane is not generated, an accident may occur. To prevent this from happening, the processor 110 may change a currently set autonomous mode to the manual mode when the autonomous vehicle does not receive any location parameter for the predetermined period after the transmission of a request signal.

When the travel mode changes, the processor 110 may control the HMI for a vehicle 150 such that the HMI for a vehicle 150 outputs information on the change in the travel mode to the user visually and acoustically.

The autonomous vehicle 100 may autonomously travel along a virtual lane that is generated using the above-described method.

Specifically, the processor 110 may generate a virtual center line CL, based on a coordinate of the virtual lane, and the vehicle control module 170 may provide a driving signal to each driving device (e.g., a driving device for a power source, a driving device for a steering device, a driving device for a brake, a driving device for suspension, a driving device for a handle, and the like) in the vehicle under the processor 110's control such that the center of the autonomous vehicle 100 follows the center line CL.

Referring back to FIG. 11, the processor 110, for example, may determine an average of the coordinates of the first and second virtual lanes VL1, VL2 adjacent to the second road facility 200b as a coordinate of a center point CP. Accordingly, the coordinate of the center point CP adjacent to the second road facility 200b may be determined as $x2+(\Delta xb1+\Delta xb2)/2$, $y2+(\Delta yb1+\Delta yb2)/2$, $z2+(\Delta zb1+\Delta zb2)/2$. Using this method, a coordinate of a center point CP adjacent to each of the road facilities 200a-200d may be determined, and connected to generate the virtual center line CL.

The processor 110 may generate a control signal such that a coordinate of the center of the autonomous vehicle 100, which is stored in the memory 120, follows the center line CL, and provide the control signal to the vehicle control module 170. The vehicle control module 170 may generate a driving signal corresponding to the control signal, and provide the driving signal to each driving device in the vehicle.

A motion predictive control (MPC) algorithm may be typically used for the control method in which the coordinate of the center of the vehicle follows the center line CL.

However, various methods used in the art to which the disclosure relates may be applied.

While traveling along the virtual lane, the autonomous vehicle 100 may transmit the virtual lane to an adjacent vehicle through a wireless network.

As described above, the autonomous vehicle 100 according to the disclosure may wirelessly connect to an adjacent vehicle through the V2V communication. In this case, the autonomous vehicle 100 may transmit the virtual lane, generated by the autonomous vehicle 100, to a plurality of adjacent vehicles that are connected on a network.

Thus, an adjacent vehicle, to which the above-described technology of the present disclosure is not applied but capable of autonomous driving according to a virtual lane, may receive the virtual lane from the autonomous vehicle 100 according to the present disclosure, and autonomously travel along the received virtual lane, even when the adjacent vehicle identifies no lane, as long as the adjacent vehicle autonomously travels along a virtual lane.

Additionally, while traveling along the virtual lane, the autonomous vehicle 100 may project the virtual lane onto the windshield through the HUD module 152.

Referring to FIG. 12, the HUD module 152 may project an image of the virtual lane VL1, VL2 onto the windshield W under the processor 110's control. In this case, the image projected onto the windshield W may have a predetermined degree of transparency. Accordingly, the driver may secure a view to the front as well as identify the virtual lane VL1, VL2, through the projected image.

Thus, even when the driver cannot ensure a visual field of an actual lane, the driver may confirm the virtual lane, thereby improving the driver's convenience and travel safety.

Hereafter, an operation method of the autonomous vehicle 100 is described in time order with reference to each example of FIGS. 13 and 14.

Referring to FIG. 13, the autonomous vehicle 100 may acquire a location coordinate through the GPS module 180 and transmit the location coordinate to the server 300 (S110). Step 110 (S110) may be performed in real time.

The autonomous vehicle 100 may acquire environment information through the camera 130 and the sensing module 160 (S120), and receive weather information from the server 300 (S310).

When ascertaining a lane identification state is a non-identifiable state, based on at least one of the acquired environment information and the received weather information, the autonomous vehicle 100 may transmit a request signal to an adjacent road facility 200 (S130).

Then the autonomous vehicle 100 may receive a location parameter from the road facility 200 having received the request signal (S140), based on the received location parameter, generate a virtual lane (S150), and then autonomously travel along the virtual lane (S150).

Referring to FIG. 14, the autonomous vehicle 100 may transmit a location coordinate to the server 300 (S110), acquire environment information (S120), and receive weather information from the server 300 (S310), as described with reference to FIG. 13.

The autonomous vehicle 100 may transmit a request signal to the server 300 when ascertaining a lane identification state is a non-identifiable state, based on at least one of the acquired environment information and the received weather information (S130).

The server 300 may identify at least one road facility 200 adjacent to the location coordinate of the autonomous vehicle 100 (S320), and transmit a transmission initiation signal to the identified road facility 200 (S330).

The road facility 200 having received the transmission initiation signal may transmit a location parameter to the autonomous vehicle 100 (S210), and the autonomous vehicle 100 having received the transmission initiation signal may transmit a receipt confirmation signal to the server 300 (S160).

Then the autonomous vehicle 100 may generate a virtual lane, based on the received location parameter (S170), and autonomously travel along the virtual lane (S180).

The method of performing each step is described above with reference to FIGS. 7 to 11. Detailed description in relation to this is omitted.

According to the disclosure, the autonomous vehicle may generate a virtual lane, based on a position of a road facility, and travel along the generated virtual lane. Additionally, the autonomous vehicle may generate a virtual lane even when the autonomous vehicle cannot identify a lane due to an external factor, and generate a virtual lane, based on a position of a fixed road facility and a relative distance between the road facility and the actual lane, thereby improving accuracy in generation of a virtual lane.

The subject matter of the disclosure is not limited by the embodiments and drawings set forth herein, and replacements, modifications and changes can be made by one having ordinary skill in the art without departing from the technical spirit of the disclosure.

The invention claimed is:

1. A method of operating an autonomous vehicle configured to travel autonomously along a virtual lane, the method comprising:

acquiring environment information from a camera and a sensing module of the autonomous vehicle;

receiving weather information corresponding to a location coordinate of the autonomous vehicle from a server;

based on the acquired environment information and the received weather information, determining whether a real lane of a road on which the autonomous vehicle is driving is identifiable;

based on determining whether the real lane is identifiable, transmitting a request signal through a wireless network;

receiving a location parameter of a road facility adjacent to the autonomous vehicle from the road facility in response to the request signal;

generating a virtual lane based on the received location parameter; and traveling autonomously along the generated virtual lane, wherein the location parameter of the road facility comprises a three-dimensional location coordinate of the road facility, a three-dimensional displacement between the road facility and a plurality of adjacent lanes, a distance to another adjacent road facility, a bending degree to another adjacent road facility, and a distance between adjacent lanes.

2. The method of claim 1, wherein transmitting the request signal through the wireless network comprises transmitting the request signal through at least one of a Bluetooth local area network, a Beacon local area network or a Wi-Fi local area network.

3. The method of claim 1, wherein acquiring the environment information comprises acquiring an external illuminance value through an illuminance sensor, and wherein transmitting the request signal based on determining whether the real lane is identifiable comprises transmitting the request signal based on the acquired external illuminance value being less than a reference illuminance value.

4. The method of claim 1, wherein acquiring the environment information comprises acquiring an external image through a camera, and
wherein transmitting the request signal based on determining whether the real lane is identifiable comprises transmitting the request signal based on an object corresponding to a lane not being acquired from the acquired external image.

5. The method of claim 1, wherein acquiring the environment information comprises acquiring a rain amount through a rain sensor, and
wherein transmitting the request signal based on determining whether the real lane is identifiable comprises transmitting the request signal based on the acquired rain amount being greater than or equal to a reference rain amount.

6. The method of claim 1, wherein transmitting the request signal is based on the received weather information.

7. The method of claim 1, wherein transmitting the request signal through the wireless network comprises receiving input of a travel mode from a user through a human machine interface (HMI) for a vehicle, and
transmitting the request signal based on the input travel mode being an autonomous mode.

8. The method of claim 1, wherein transmitting the request signal through the wireless network comprises transmitting the request signal to the road facility adjacent to the autonomous vehicle, and
wherein the location parameter is transmitted to the autonomous vehicle by the road facility in response to the request signal.

9. The method of claim 1, wherein transmitting the request signal through the wireless network comprises transmitting the request signal to the server,
wherein the server transmits a transmission initiation signal to at least one road facility which is within a predetermined distance from the location coordinate of the autonomous vehicle in response to the request signal, and
wherein the at least one road facility transmits the location parameter to the autonomous vehicle in response to the transmission initiation signal.

10. The method of claim 1, wherein receiving the location parameter of the road facility from the road facility comprises receiving the location parameter of the road facility according to a reference cycle that is set based on at least one of the weather information received from the server, a number of adjacent vehicles or a travel speed of an adjacent vehicle.

11. The method of claim 1, wherein receiving the location parameter of the road facility from the road facility comprises receiving the location parameter of the road facility according to a reference cycle that is set based on a curvature of a travel road.

12. The method of claim 1, further comprising changing a travel mode to a manual mode based on the location parameter not being received for a predetermined period.

13. The method of claim 1,
wherein generating the virtual lane based on the received location parameter comprises generating the virtual lane based on the three-dimensional location coordinate of the road facility, and the three-dimensional displacement between the road facility and the plurality of lanes.

14. The method of claim 1, further comprising projecting the generated virtual lane onto a windshield through a head up display (HUD) module.

15. The method of claim 1, further comprising transmitting the generated virtual lane to an adjacent vehicle through a second wireless network.

* * * * *